US010127678B2

(12) United States Patent
Pérez Acal et al.

(10) Patent No.: US 10,127,678 B2
(45) Date of Patent: Nov. 13, 2018

(54) MODULAR DEVICE FOR HIGH-SPEED VIDEO VIBRATION ANALYSIS

(71) Applicant: Airbus Defence and Space GmbH, Ottobrunn (DE)

(72) Inventors: Antonio Pérez Acal, Ingolstadt (DE); Gianluca Marsiglia, Ingolstadt (DE); Daniele Nadalutti, Ingolstadt (DE)

(73) Assignee: AIRBUS DEFENCE AND SPACE GMBH, Ottobrunn (DE)

( * ) Notice: Subject to any disclaimer, the term of this patent is extended or adjusted under 35 U.S.C. 154(b) by 19 days.

(21) Appl. No.: 15/374,592

(22) Filed: Dec. 9, 2016

(65) Prior Publication Data
US 2017/0169575 A1 Jun. 15, 2017

(30) Foreign Application Priority Data
Dec. 10, 2015 (EP) .................................. 15199331

(51) Int. Cl.
G06K 9/00 (2006.01)
G06T 7/292 (2017.01)
(Continued)

(52) U.S. Cl.
CPC .............. *G06T 7/292* (2017.01); *G01B 11/16* (2013.01); *G01H 9/00* (2013.01); *G06T 7/262* (2017.01);
(Continued)

(58) Field of Classification Search
CPC ..................... G06T 7/292; G06T 17/00; G06T 2207/10021; G06T 2207/10028;
(Continued)

(56) References Cited

U.S. PATENT DOCUMENTS

2006/0221072 A1   10/2006  Se et al.
2006/0262319 A1*  11/2006  Gatt .................. G01H 9/00
                                                356/492
(Continued)

FOREIGN PATENT DOCUMENTS

WO        2006084385        8/2006

OTHER PUBLICATIONS

European Search Report, dated Jun. 10, 2016, priority document.
(Continued)

Primary Examiner — John Strege
(74) Attorney, Agent, or Firm — Greer, Burns & Crain, Ltd.

(57) ABSTRACT

A technique for modular high-speed video vibration analysis of a structure. An embodiment of a device for high-speed video vibration analysis comprises a camera arrangement configured to generate at least two high-speed video streams of the structure and a data analyzer unit, connected to the camera arrangement. The data analyzer unit comprises a processing unit configured to extract vibrational data of at least a portion of the captured structure by considering estimated deformations of at least a portion of the captured structure along a first plane and determined depth information of at least a portion of the captured structure along a second plane different from the first plane or along an axis included in the second plane.

12 Claims, 16 Drawing Sheets

(51) Int. Cl.

| | | |
|---|---|---|
| G01H 9/00 | (2006.01) | |
| G06T 7/593 | (2017.01) | |
| G06T 7/262 | (2017.01) | |
| H04N 13/246 | (2018.01) | |
| H04N 13/271 | (2018.01) | |
| H04N 13/214 | (2018.01) | |
| G01B 11/16 | (2006.01) | |
| G06T 17/00 | (2006.01) | |
| H04N 13/00 | (2018.01) | |

(52) U.S. Cl.
CPC ............. *G06T 7/593* (2017.01); *G06T 17/00* (2013.01); *H04N 13/214* (2018.05); *H04N 13/246* (2018.05); *H04N 13/271* (2018.05); *G06T 2207/10021* (2013.01); *G06T 2207/10028* (2013.01); *G06T 2207/10152* (2013.01); *G06T 2207/20016* (2013.01); *H04N 2013/0081* (2013.01); *H04N 2013/0085* (2013.01)

(58) Field of Classification Search
CPC .......... G06T 2207/10152; G01B 11/16; H04N 13/0271; H04N 13/0246; H04N 13/0214; H04N 2013/0081; H04N 2013/0085
See application file for complete search history.

(56) References Cited

U.S. PATENT DOCUMENTS

| | | | | |
|---|---|---|---|---|
| 2013/0329953 | A1* | 12/2013 | Schreier | G06T 7/2093 382/103 |
| 2015/0319540 | A1* | 11/2015 | Rubinstein | H04R 23/008 381/172 |
| 2016/0171309 | A1* | 6/2016 | Hay | G06T 7/11 348/143 |
| 2016/0217587 | A1* | 7/2016 | Hay | G06T 7/11 |
| 2016/0300341 | A1* | 10/2016 | Hay | G06K 9/0053 |
| 2017/0116725 | A1* | 4/2017 | Stuart | G06T 7/0004 |

OTHER PUBLICATIONS

"3D digital image correlation methods for full-field vibration measurement", Helfrick et al., Aug. 27, 2010.
"Modal identification of simple structures with high-speed video using motion magnification", Chen et al., Mar. 2, 2015.
"Visual vibrometry: Estimating material properties from small motions in video", Davis et al., Jun. 7, 2015.
"Microsoft kinect Sensor and Its Effect", Zhengyou, Feb. 1, 2012.
"Eulerian video magnification for revealing subtle changes in the world ACM Trans Graph" (Proceedings SIGGRAPH 2012), vol. 31, Wu et al.
"Phase-Based Vdeo Motion Processing, ACM Trans Graph" (Proceedings SIGGRAPH 2013), vol. 32. Wadhwa et al.
"Developments with Motion Magnification for Structural Modal Identification Through Camera Video, Dynamics of Civil Structures", vol. 2, 49-57, Chen et al.
"Structural modal identification through high speed camera video: Motion magnification, Topics in Modal Analysis I", vol. 7, 191-197, Chen et al.
"Modal identification of simple structures with high-speed video using motion magnification, Journal of Sound and Vibration" 345, 58-71, Chen et al.
Pyramid for fast phase-based video magnification, 2014 IEEE International Conference on Computational Photography (ICCP), Santa Clara, CA, May 2-4, 2014, IEEE, 2014, N. Wadhwa et al.
"The steerable pyramid: a flexible architecture for multi-scale derivative computation, Proceedings of the 1995 International Conference on Image processing" (ICIP'95), vol. 3, IEEE Computer Society, Washington, DC, USA, 1995, 99. 444-447.

The design and use of steerable filters, IEEE Transactions on Pattern Analysis and machine Intelligence 13 (9) (1991) 891-906, W.T. Freeman et al.
An interative image registration technique with an application to stereo vision, Proceedings of the Seventh International Joint Conference on Artificial Intelligence (IJCAI'81), 1981, pp. 674-679.
"Microwave interferometers for non-contact vibration measurements on large structures, Mechanical Systems and Signal Processing" 13 (2) (1999) 241-253, C.R. Farrar et al.
"Modal testing using impact excitation and a scanning LDV, Shock and Vibration" 7 (2), (2000) 91-100, A. Stanbridge et al.
"Application of stroboscopic and pulsed-laser electronic speckle pattern interferometry (ESPI) to modal analysis problems, Measurement Science and Technology" 13(4), (2002) 451, H. Van Der Auweraer et al.
Damage detection using optical measurements and wavelets, Structural Health Monitoring 1 (1) (2002) 5-22, S. Patsias et al.
"A vision-based approach for the direct measurement of displacements in vibrating systems, Smart Materials and Structures" 12(5) (2003) 785, A.M. Wahbeh et al.
"A vision-based system for remote sensing of bridge displacement, NDT&E International" 39(5) (2006) 425-431.
"A vision system for vibration monitoring of civil engineering structures, Experimental Techniques"35(4) (2011) 74-82, E. Caetano et al.
"Time-of-flight sensors in computer graphics, Proceedings of Eurographics (State of the Art Report)", 2009, pp. 119-134, A. Kolb et al.
A phase-based approach to the estimation of the optical flow field using spatial filtering, IEEE Transactions on Neural Networks 13(5) (2002) 1127-1136, T. Gautama et al.
"Classification and evaluation of cost aggregation methods for stereo correspondence, IEEE International Conference on Computer Vision and Pattern Recognition (CVPR 2008)", R. Tombari et al.
"Dense stereo correspondence based on recursive adaptive size multi-windowing. In Proc. Image and Vision Computing New Zealand (IVCNZ'03)", vol. 1, pp. 256-260, 2003. S. Chan et al.
"Image-gradient-guided real-time stereo on graphics hardware. In Proc. Int. Conf. 3D Digital Imaging and Modeling (3DIM)", pp. 548-555, 2005, M. Gong et al.
"Real-time correlation-based stereo vision with reduced border errors, Int. Journ. of Computer Vision", 47:1-3, 2002., H. Hirschmuller et al.
"Handling occlusions in dense multi-view stereo. In Proc. Conf. on Computer Vision and Pattern recognition (CVPR 2001)", pp. 103-110, 2001., S. Kang et al.
"Segmentation-based adaptive support for accurate stereo correspondence PSIVT" 2007, F. Tombari et al.
"A taxonomy and evaluation of dense two-frame stereo correspondence algorithms. Int. Jour. Computer Vision", 47 (1/2/3):7-42, 2002, D. Scharstein et al.
"Evaluation of cost functions for stereo matching. In IEEE Computer Society Conference on Computer Vision and Pattern recognition" (CVPR 2007) H. Hirschmueller et al.
A pixel dissimilarity measure that is insensitive to image sampling. IEEE Transactions on Pattern Analysis and Machine Intelligence, 20 (4): 401-406, Apr. 1998., S. Birchfield et al.
"Detecting motion by means of 2D and 3D information ACCV'07 Workshop on Multi-dimensional and Multi-view Image Processing" (ACCV 2007 WS), F. Tombari et al.
"Real-time correlation-based stereo: Algorithm. Implementation and Applications", INRIA TR n. 2013, 1993, O. Faugeras et al.
"A survey, Image Vision Computing", vol. 21, No. 11, pp. 977-1000, 2003., B. Zitova et al.
"A fast area-based stereo matching algorithm, Image and Vision Computing", 22(12), pp. 983-1005, Oct. 2004., L. Di Stefano et al.
A PC-based real-time stereo vision system, Machine Graphics & Vision, 13(3), pp. 197-220, Jan. 2004, L. Di Stefano et al.
"Fast full-search equivalent template matching by Enhanced Bounded Correlation, IEEE transactions on Image Processing", 17(4), pp. 528-538, Apr. 2008., S. Mattoccia et al.
"Performance evaluation of robust matching measures 3rd International Conference on Computer Vision theory and Applications" (VISAPP 2008)., F. Tombari et al.

(56) References Cited

OTHER PUBLICATIONS

"A comparative study of Energy Minimization Methods for Markov Random Fields with Smoothness-Based Priors, IEEE Transactions on Pattern Analysis and machine Intelligence", 30, 6, Jun. 2008, pp. 1068-1080, R. Szeliski et al.

"A revisit to cost aggregation in stereo matching: how far can we reduce its computational redundancy?", ICCV 2011, D. Min et al.

* cited by examiner

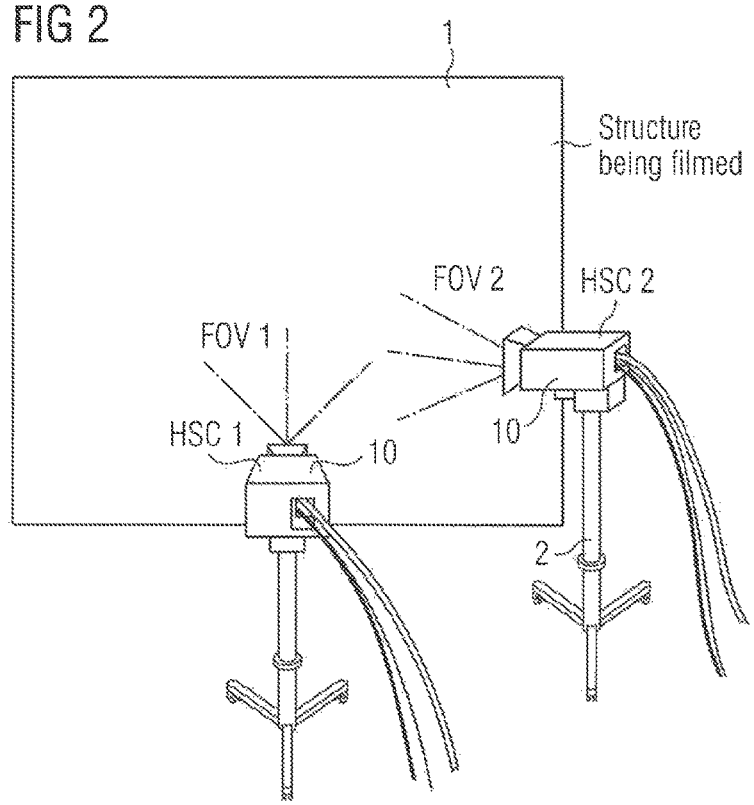
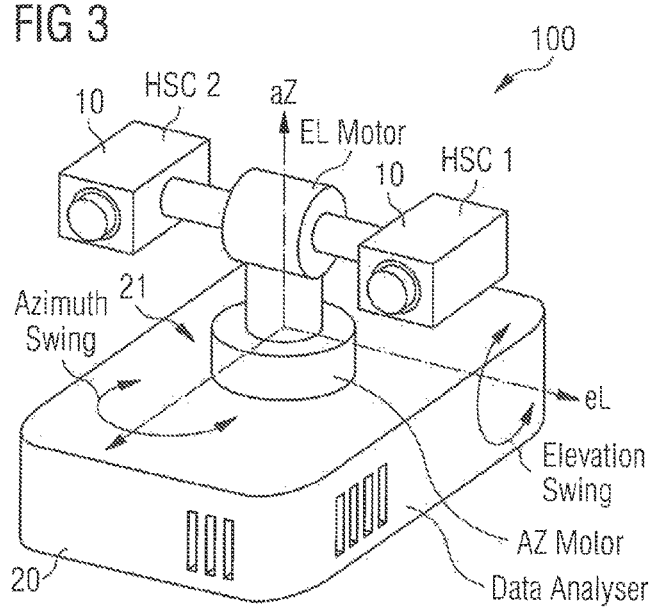

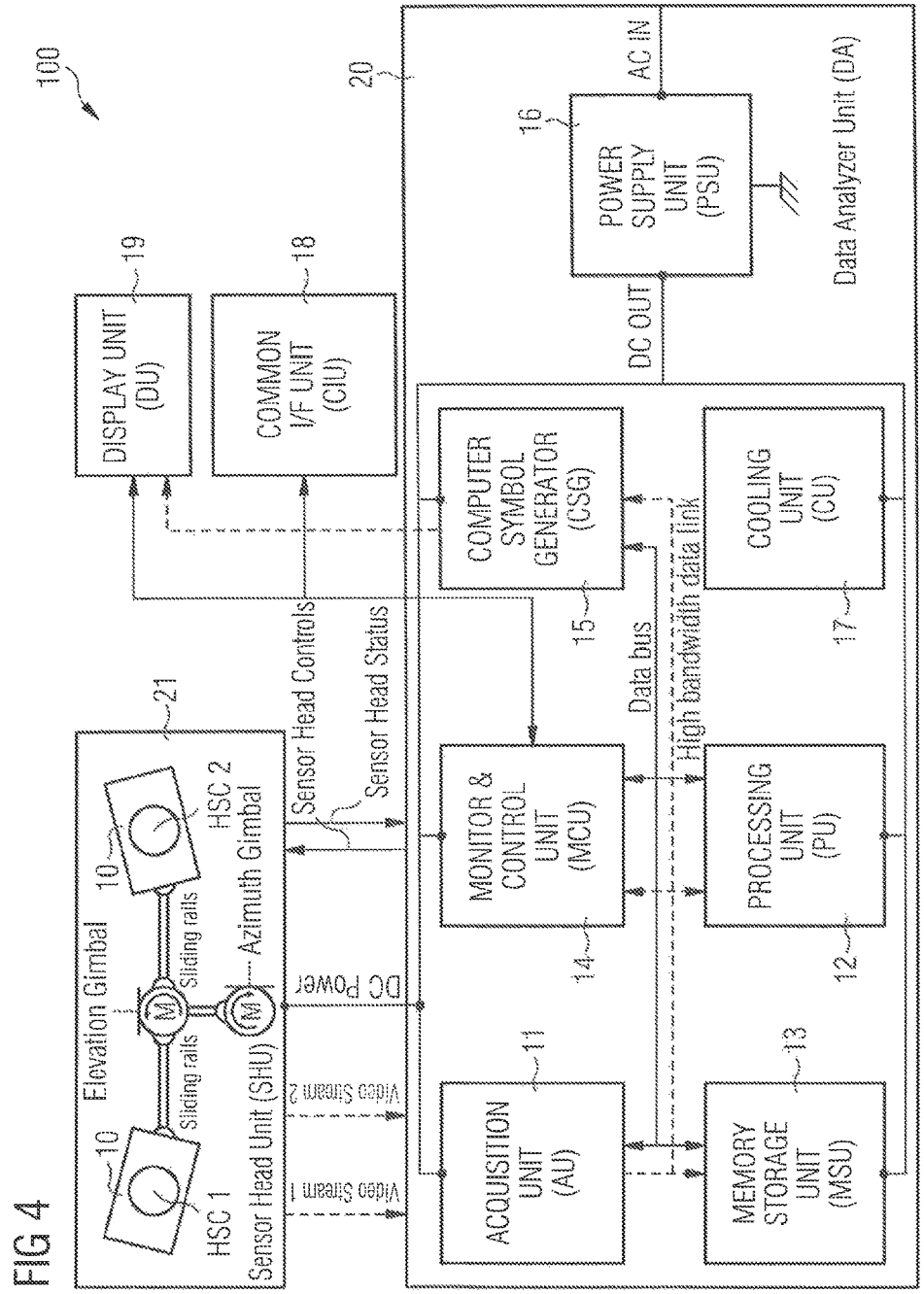

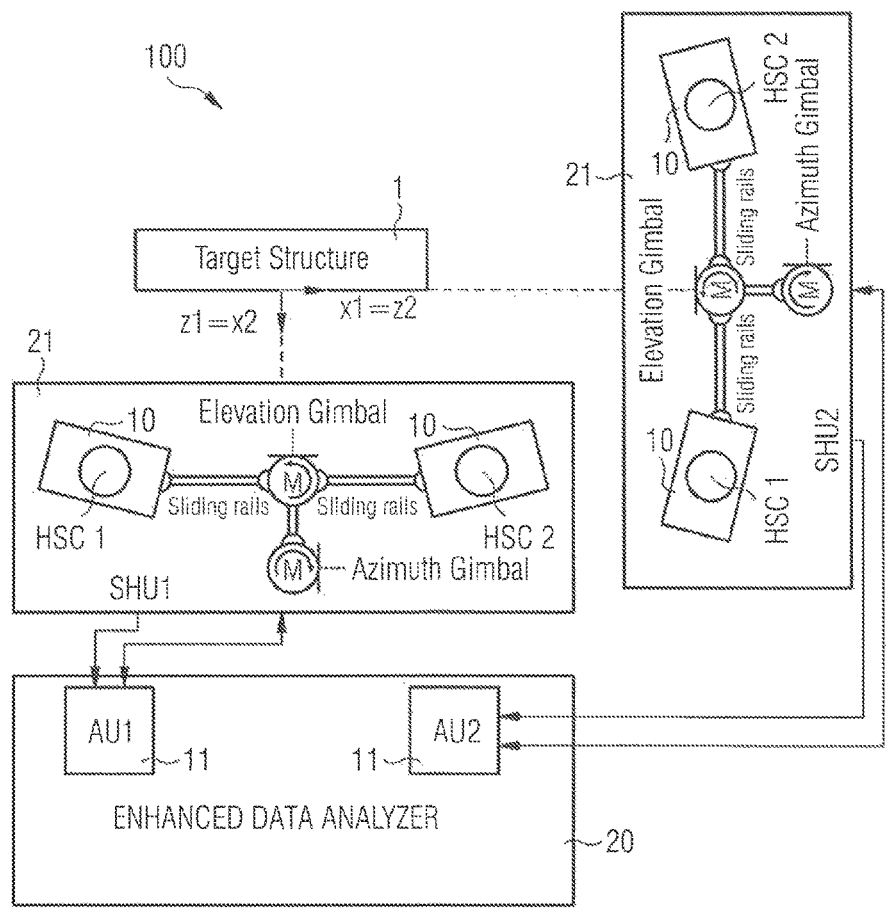

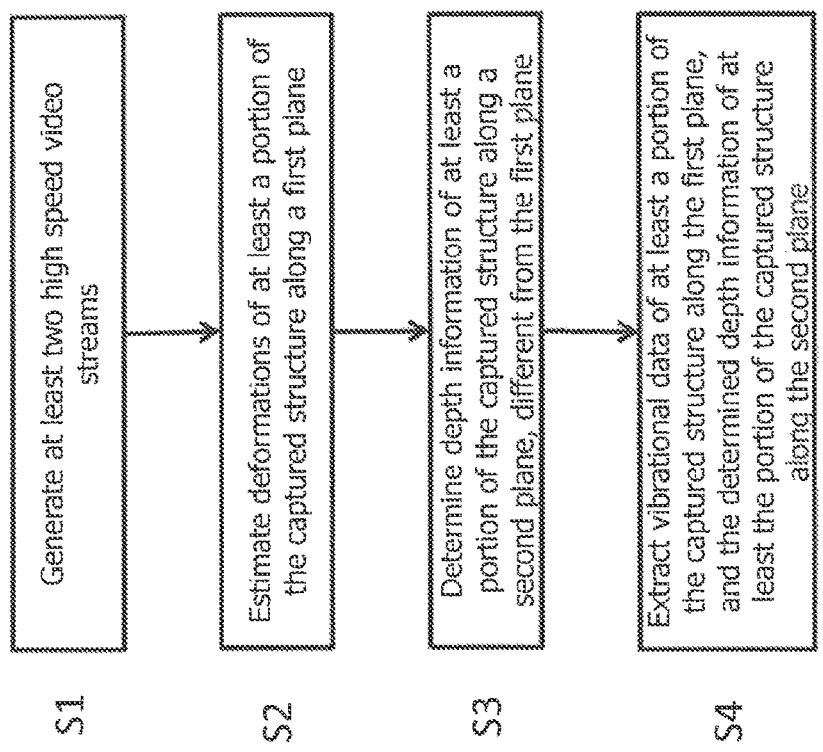

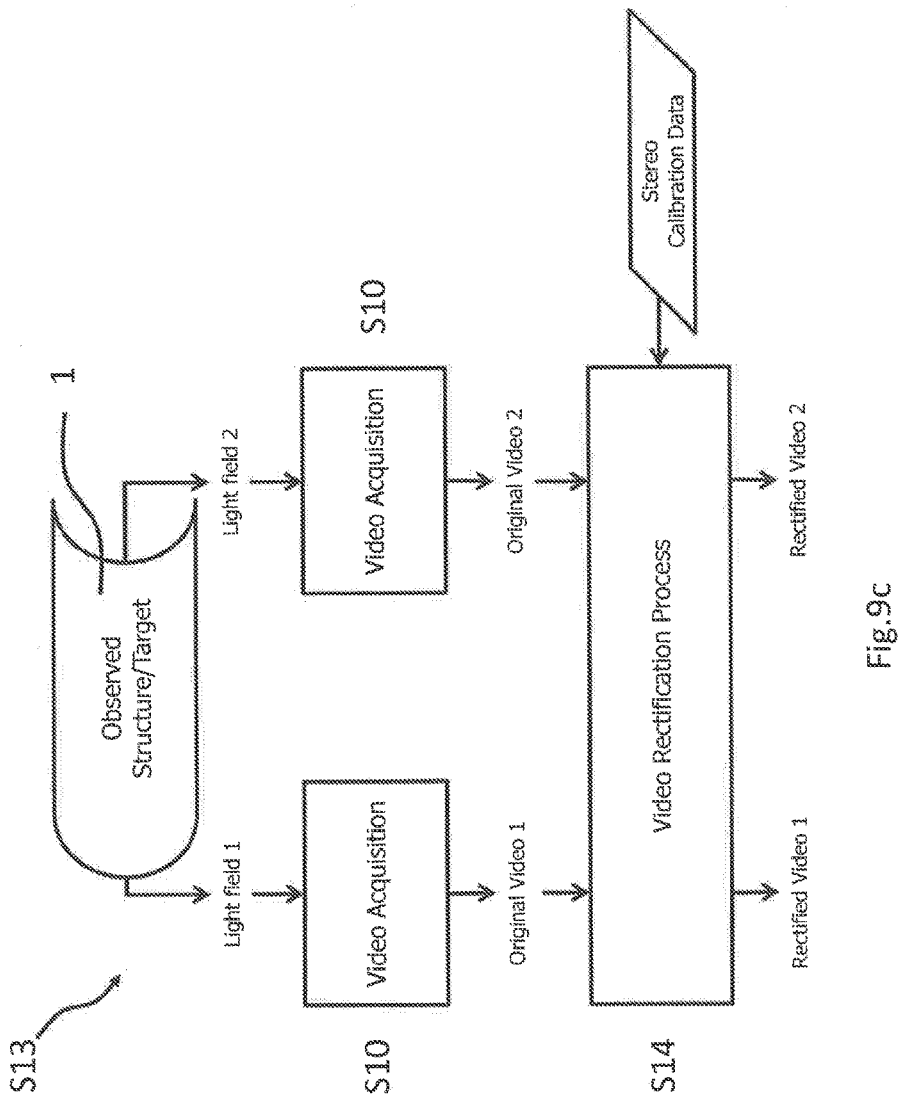

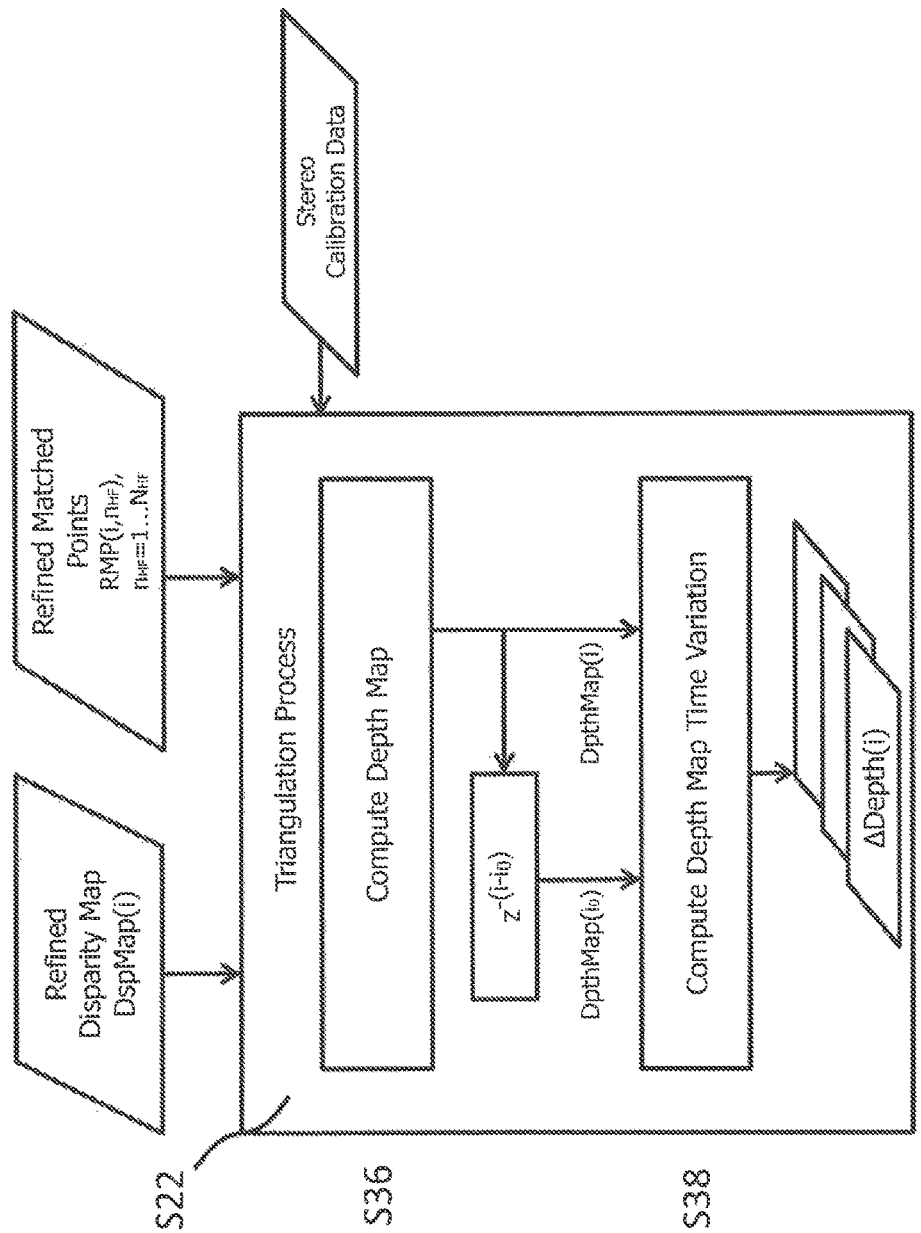

MODULAR DEVICE FOR HIGH-SPEED VIDEO VIBRATION ANALYSIS

CROSS-REFERENCES TO RELATED APPLICATIONS

This application claims the benefit of the European patent application No. 15 199 331.8 filed on Dec. 10, 2015, the entire disclosures of which are incorporated herein by way of reference.

BACKGROUND OF THE INVENTION

The present disclosure generally relates to the field of vibration analysis. More specifically, the present disclosure relates to a technique for high-speed video vibration analysis of structures.

Nowadays, vibration and structural health testing in the industry and, more specifically, ground and flight testing in the aeronautical industry, are based fundamentally on devices known as accelerometers. Despite being very accurate and reliable, accelerometers need long preparation and installation time, demand highly qualified operators, load the structure under test with their own mass (thus altering the vibration response of the structure) and can only measure at discrete points.

More modern non-contact technology is represented by Laser Doppler Vibrometers (LDVs). LDVs are mainly applied in the automotive industry, although aeronautical, civil, acoustic, defense and security fields make also use of this technology to a certain extent. The main drawbacks of LDVs are affordability (very high price), operability (LDVs' performance worsen with exposure to external daylight and fall off rapidly when the distance to the target increases), and versatility (they are active optical systems, characterized by high power consumption and typically "bulky", i.e., they cannot be operated in limited space or too far from the surface to observe).

Moreover, only targets with a limited size (typically in the order of one square meter) can be tested with LDVs, and the surface under observation must be perpendicular to the laser beam.

Thus, there is a need for an improved technique for vibration analysis of structures.

SUMMARY OF THE INVENTION

According to a first aspect, a device for high-speed video vibration analysis of a structure is provided. The device comprises a camera arrangement and a data analyzer unit. The camera arrangement is adapted and configured to generate at least two high-speed video streams of the structure. The data analyzer unit is connected to the camera arrangement and comprises a processing unit. The processing unit is adapted and configured to estimate, from at least one of the at least two high-speed video streams, deformations of at least a portion of the captured structure along a first plane. The processing unit is further adapted and configured to determine, from the at least two high-speed video streams, depth information of at least a portion of the captured structure along a second plane, different from the first plane, or along an axis included in the second plane. The processing unit is further adapted and configured to extract vibrational data of at least a portion of the captured structure by considering the estimated deformations of at least the portion of the captured structure along the first plane, and the determined depth information of at least the portion of the captured structure along the second plane or along the axis included in the second plane.

In this way, vibration analysis of structures based on high-speed video processing can be achieved. Herein, the term "high-speed video" may be understood as any video recorded with a high temporal resolution, e.g., at least twice as high as the maximum temporal frequency of the structure's vibrations of interest. The device for high-speed video vibration analysis may perform contactless/non-contact vibration analysis based on high-speed video processing. In other words, the device may be suitable for performing high-speed video based non-contact vibration analysis of a structure. The device for high-speed video vibration analysis may also be referred to as modular device for high-speed video vibration analysis.

The aforementioned portions of the structure may be the same, e.g., may have the same size, shape and/or position. For example, the processing unit may be adapted and configured to estimate, from exactly one of the at least two high-speed video streams, the deformations of at least the portion of the captured structure along a first plane. The axis included in the second plane may be an out-of-plane axis or may be parallel to the out-of-plane axis. The out-of-plane axis will be described in more detail below.

A deformation may be referred to a deformation of the structure, which may represent by a deformation of the captured structure in a high-speed video stream being any kind of variation, motion or vibration, which can lead to vibrational data.

The processing unit may be adapted and configured to extract the vibrational data of at least the portion of the captured structure by combining the estimated deformations of at least the portion of the captured structure along the first plane, and the determined depth information of at least the portion of the captured structure along the second plane.

The consideration, e.g., combination, of the estimation of the deformations and the determination of the depth information makes it possible to extract vibrational data from two orthogonal planes. In consequence, it is possible to sense any variation of the structure in any direction in space, wherein the camera arrangement, e.g., one or more high-speed cameras, is able to operate also in daylight conditions. The one or more high-speed cameras of the camera arrangement may be optical passive sensors, wherein no energy emission is required and a distance to the structure and/or the structures spatial extension can be handled by simply adjusting the optics set-up (i.e., focal length and field-of-view).

In one or more embodiments, the data analyzer unit may further comprise an acquisition unit that is adapted and configured to control the camera arrangement and/or to synchronize the at least two high-speed video streams.

The processing unit may further be adapted and configured to rectify the at least two high-speed video streams onto the first plane.

The processing unit may further be configured to detect vibration modes associated with the estimated deformations of at least the portion of the captured structure along the first plane.

The processing unit may further be configured to extract the vibrational data of at least the portion of the captured structure by combining the estimated deformations of at least the portion of the captured structure along the first plane, the detected vibration modes associated with the estimated deformations of at least the portion of the captured structure along the first plane and the computed deformations of at least the portion of the captured structure along the second plane.

The camera arrangement may comprise at least one high-speed camera. For example, the camera arrangement may comprise at least two high-speed cameras. Each camera may be arranged and adapted and configured to capture the structure and generate a high-speed video stream of the at least two high-speed video streams.

As stated above, the second plane is different from the first plane. The second plane may be perpendicular to the first plane. For example, the first plane may be or comprise a plane of the camera arrangement, for example the so-called in-plane, e.g., the plane of the camera arrangement onto which the captured, e.g., filmed, structure and potentially its surrounding are projected. In other words, the first plane may be referred to as an in-plane representing the projection of the captured structure and its surroundings onto the high-speed cameras' image planes.

The second plane may be or comprise an out-of-plane. The out-of-plane may be perpendicular to the in-plane and may be produced by at least one viewing direction of a high-speed camera. The second plane may be or comprise an out-of-plane axis, e.g., the optical axis of the camera arrangement. In case of the camera arrangement comprising at least two high-speed cameras, the at least two cameras may be separated from each other by a baseline, which may form part of the first plane (e.g., the in-plane), wherein the baseline may have an orthogonal axis, which may form the second plane (e.g., the out-of-plane). It is further possible that the baseline may construct the second plane and the corresponding perpendicular plane may be the first plane, respectively. Moreover, the second plane may be or comprise an axis normal to the first plane or the first plane may be or comprise an axis normal to the second plane.

The device for high-speed video vibration analysis may comprise a display unit. The display unit may be adapted and configured to display at least one of a user input, a user setting, one or more of the at least two high-speed video streams, the extracted vibrational data of at least the portion of the captured structure, a synthetic or model-based representation of the estimated deformations, and/or the determined depth information. The display unit may be further connected to the data analyzer unit via at least one of a dedicated high bandwidth data link and a data bus.

The device for high-speed video vibration analysis may comprise a graphical user interface. The graphical user interface may be adapted and configured to import and display model-based results and align the model-based results with the extracted vibrational data, e.g., by dedicated controls and windows of the graphical user interface. The graphical user interface may be adapted and configured to import and display model-based results produced by a third-party software. The graphical user interface may further be adapted and configured to align the model-based results with the extracted vibrational data by dedicated controls and windows of the graphical user interface. Controls and windows may be knobs and sliders, displayed on the graphical user interface, providing a user to control parameters influencing the processing unit. Controls and windows may be a selector for cropping a frame of the at least two high-speed video streams to select a point or region of the at least a portion of the captured structure. Controls and windows may be a control for specifying a direction to be investigated in the first plane and/or the second plane. A user may use the display unit to control the graphical user interface.

The camera arrangement may comprise a high-speed video camera that is configured to operate in a visible spectrum and a high-speed video camera that is configured to operate in a non-visible spectrum. The modular device for high-speed video vibration analysis may be adapted and configured to support different types of video peripherals operating either in a visible spectrum or in a non-visible spectrum, for example Far/Mid/Near Infrared, Ultraviolet. It is possible that the display video rate can vary from 25 Hz up to 120 Hz to high-speed frame rates higher than 120 Hz, for example 1000 or 10000 frames per second or higher. The use of mixed configurations of peripherals is an option to be exploited in conjunction with sensor fusion techniques.

The device for high-speed video vibration analysis may further comprise a common interface unit. The common interface unit may be connected to the data analyzer unit. The common interface unit may be adapted and configured to carry out the user input and may comprise at least one of a touch display, a dedicated keyboard, a mouse and a universal serial bus.

The device for high-speed video vibration analysis may further comprise a memory storage unit. The memory storage unit may be connected to the data analyzer unit via at least one of a dedicated high bandwidth data link and a data bus. The memory storage unit may be adapted and configured to store a high-speed video stream.

The device for high-speed video vibration analysis may comprise a cooling unit. The cooling unit may be connected to the data analyzer unit, and may be arranged and adapted and configured to dissipate heat.

The device for high-speed video vibration analysis may comprise a power supply unit. The power supply unit may be arranged and adapted and configured to supply power to the camera arrangement, e.g., the at least two high-speed cameras, the data analyzer unit and the cooling unit.

The data analyzer unit of the device for high-speed video vibration analysis may comprise at least one of a monitor and control unit and a computer symbol generator. The monitor and control unit may be adapted and configured to synchronize data transfer and data processing of the data analyzer unit. The computer symbol generator may be adapted and configured to combine the extracted vibrational data with at least one of the at least two high-speed video streams, a user input, a user setting and/or model-based results produced by third-party software.

The camera arrangement and the data analyzer unit may be mechanically and electrically modular. The camera arrangement and the data analyzer unit may be connected via a dedicated high bandwidth video link and a dedicated power link.

A remote control, for example a hand-held tablet computer, may be connectable or connected to the data analyzer unit according to via a wireless data link. In this respect, the data analyzer unit may be used as a docking station for recharging a battery of the remote control. The device for high-speed video vibration analysis may be adapted and configured to be storable or stored in a portable hardware case.

The device for high-speed video vibration analysis may comprise a sensor head unit. The sensor head unit may be arranged and adapted and configured to carry the at least two high-speed cameras being able to rotate in azimuthal and elevational direction to be controlled by the data analyzer unit. In other words, the camera arrangement, e.g., the one or more cameras, may be mounted on or enclosed in the sensor head unit that may be connected to the data analyzer unit. The sensor head unit may comprise a guide rail for sliding the one or more, e.g., at least two, high-speed cameras.

The data analyzer unit may be adapted and configured to synchronize the sensor head unit and control a distance between the at least two high-speed cameras, an orientation of the sensor head unit and an alignment of the at least two high-speed cameras to the target/structure.

The device for high-speed video vibration analysis may comprise a solid state accelerometer and/or a gyro sensor and/or a motion sensor. The solid state accelerometer and/or gyro sensor and/or motion sensor may be located at or in the sensor head unit for vibration compensation of the sensor head unit. Inside the sensor head unit, accelerometers and/or gyro sensors and/or motion sensors may be as well located at and/or in the camera arrangement. The accelerometers and/or the gyro sensors and/or the motion sensors may therefore be adapted and configured to detect the self-vibrations of the sensor head unit and/or the camera arrangement. The sensor head unit may be further adapted and configured to provide with an acquisition process that is able to read the analogue/digital signals produced by the accelerometers, the gyros and the motion sensors. The self-vibration acquisition process may be further adapted and configured to be synchronous to the video acquisition process (that is: given the high-speed camera frame rate, it will be possible to further associate video frames acquired from the high-speed cameras at times ti, ti+1, . . . ti+N, to the output of the accelerometers, the gyros and the motion sensors at times ti, ti+1, . . . ti+N). The sensor head unit may be as well adapted and configured to further elaborate the signals acquired from the accelerometer, the gyros and the motion sensors in order to convert/process/merge them into a suitable data stream which we refer to here as self-vibration data. The sensor head unit may be further adapted and configured such that self-vibration data stream is provided together with or embedded within the video data stream. The sensor head unit may be further adapted and configured to provide the data analyzer unit with the self-vibration data relative to the sensor head unit and/or the camera arrangement. The processing unit may be further adapted and configured to acquire and process the self-vibration data in order to correct the estimated deformations and/or the determined depth information of the structure parts being monitored.

The device for high-speed video vibration analysis may comprise a movable platform on which the camera arrangement is arranged. The movable platform may be a robotic platform. The movement of the platform may be remotely controlled.

The movable platform may comprise its own sensors. For example, the platform may comprise at least one of accelerometers and/or gyro sensors and/or motion sensors. The accelerometers and/or gyro sensors and/or motion sensors may be adapted and configured to detect self-vibrations of the moveable platform and/or the camera arrangement. The accelerometers and/or the gyro sensors and/or the motion sensors may be further adapted and configured to provide the detected (resulting) self-vibrations data or the detected self-vibrations to the data analyzer unit. Self-vibration data or the detected self-vibrations may be provided together with or embedded within the video data stream transmitted to the data analyzer unit, or provided together with or embedded within the at least two high-speed video streams provided to the data analyzer unit. The processing unit may further be adapted and configured to correct the vibrational data of the structure parts being monitored based on the detected self-vibrations of the moveable platform and/or the camera arrangement.

A second aspect is directed to the use of the device for high-speed video vibration analysis according to the first aspect in the non-contact vibration analysis of aerospace vehicles or other kind of devices or structures, for example machines, cars, buildings or bridges.

According to a third aspect, a method for high-speed video vibration analysis of a structure is provided. The method comprises generating, by a camera arrangement, at least two high-speed video streams of the structure. The method further comprises estimating, by a processing unit of a data analyzer unit, from at least one of the at least two high-speed video streams, deformations of at least a portion of the structure along a first plane. The method further comprises determining, by the processing unit, from the at least two high-speed video streams, depth information of at least a portion of the structure along a second plane, different from the first plane, or along an axis included in the second plane. The method further comprises extracting, by the processing unit, vibrational data of at least the portion of the captured structure by considering the estimated deformations of at least the portion of the captured structure along the first plane and the determined depth information of at least the portion of the captured structure along the second plane or along the axis included in the second plane.

The portion of the captured structure may be a user-selected point and/or region of the structure.

The steps of estimating, determining and extracting may be performed in a user-selected order.

Vibrational data according to the first, the second and the third aspect may be converted into a suitable set of outputs, for example synthetic markers at the region/point of interest, superimposed to the high-speed video streams. Another suitable output may be virtual deflections superimposed to the video of the structure and colored according to their amplitudes. Another suitable output may be dynamic graphics and plots with the evolution in runtime of frequencies, amplitudes, speeds, accelerations and Fourier Transforms. Another suitable output may be data files, wherein all user settings, input video streams and related processing outputs are stored. Another suitable output may be audio warnings triggered by user defined events, for example when the estimated amplitude or deflection at a specific region/point of interest exceeds a predefined threshold, configured via a graphical user interface. Another suitable output may be tables and/or 3D models, wherein data from previous analysis, for example FEM studies, are compared and/or superimposed to the incoming high-speed video streams. The step of superimposing may be performed by a computer symbol generator unit.

The structure mentioned herein may be an aerospace vehicle (e.g., an aircraft, a helicopter or a satellite) or another structure. In accordance therewith, the portion of the structure may be a region of the structure, a part of the structure and/or a component of the structure.

In general, the steps of any one of the method aspects described herein may equally be performed in one or more suitable components, devices or units, e.g., in suitable components of the vibration analysis device, e.g., the data analyzer unit, the processing unit, the camera arrangement and the like.

According to a fourth aspect, a computer program is provided. The computer program comprises program code portions for causing the steps of any one of the method aspects described herein to be performed, when the computer program is run on a computer system or on one or more computing devices. The computer program may be stored on a computer-readable recording medium or may be downloadable as a signal.

BRIEF DESCRIPTION OF THE DRAWINGS

In the following, the present disclosure will be further described with reference to exemplary embodiments illustrated in the Figures, in which:

FIG. 2 is a schematic representation of a structure to be captured by two high-speed cameras;

FIG. 3 is a schematic representation of a sensor head unit, illustrated as a gimballed system comprising two high-speed cameras;

FIG. 4 is a schematic representation of an embodiment of a modular device for high-speed video vibration analysis with a gimballed sensor head unit;

FIG. 5 is a schematic representation of a scenario with two gimballed sensor head units, connected to an enhanced data analyzer unit, capturing a target;

FIG. 8 is a schematic flow diagram of a method embodiment for high-speed video based non-contact vibration analysis of a structure;

FIG. 9c is a schematic flow diagram of a video acquisition process that may be part of the embodiments for high-speed video based non-contact vibration analysis of a structure;

FIG. 9h is a schematic flow diagram of a triangulation process that may be part of the embodiments for high-speed video based non-contact vibration analysis of a structure;

DETAILED DESCRIPTION OF THE PREFERRED EMBODIMENTS

In the following description, for purposes of explanation and not limitation, specific details are set forth, such as specific algorithms, in order to provide a thorough understanding of the present disclosure. It will be apparent to one skilled in the art that the present disclosure may be practiced in other embodiments that depart from these specific details. For example, although the present disclosure is mainly described with reference to two high-speed cameras, any number of high-speed cameras is conceivable.

Those skilled in the art will further appreciate that functions explained herein below may be implemented using individual hardware circuitry, using software functioning in conjunction with a programmed microprocessor or a general purpose computer, using an Application Specific Integrated Circuit (ASIC) and/or using one or more Digital Signal Processors (DSPs). It will also be appreciated that when the present disclosure is described as a method, it may also be embodied in a computer processor and a non-volatile memory coupled to a processor, wherein the memory is encoded with one or more programs to cause the processor to perform the methods disclosed herein when executed by the processor.

Figure 1:
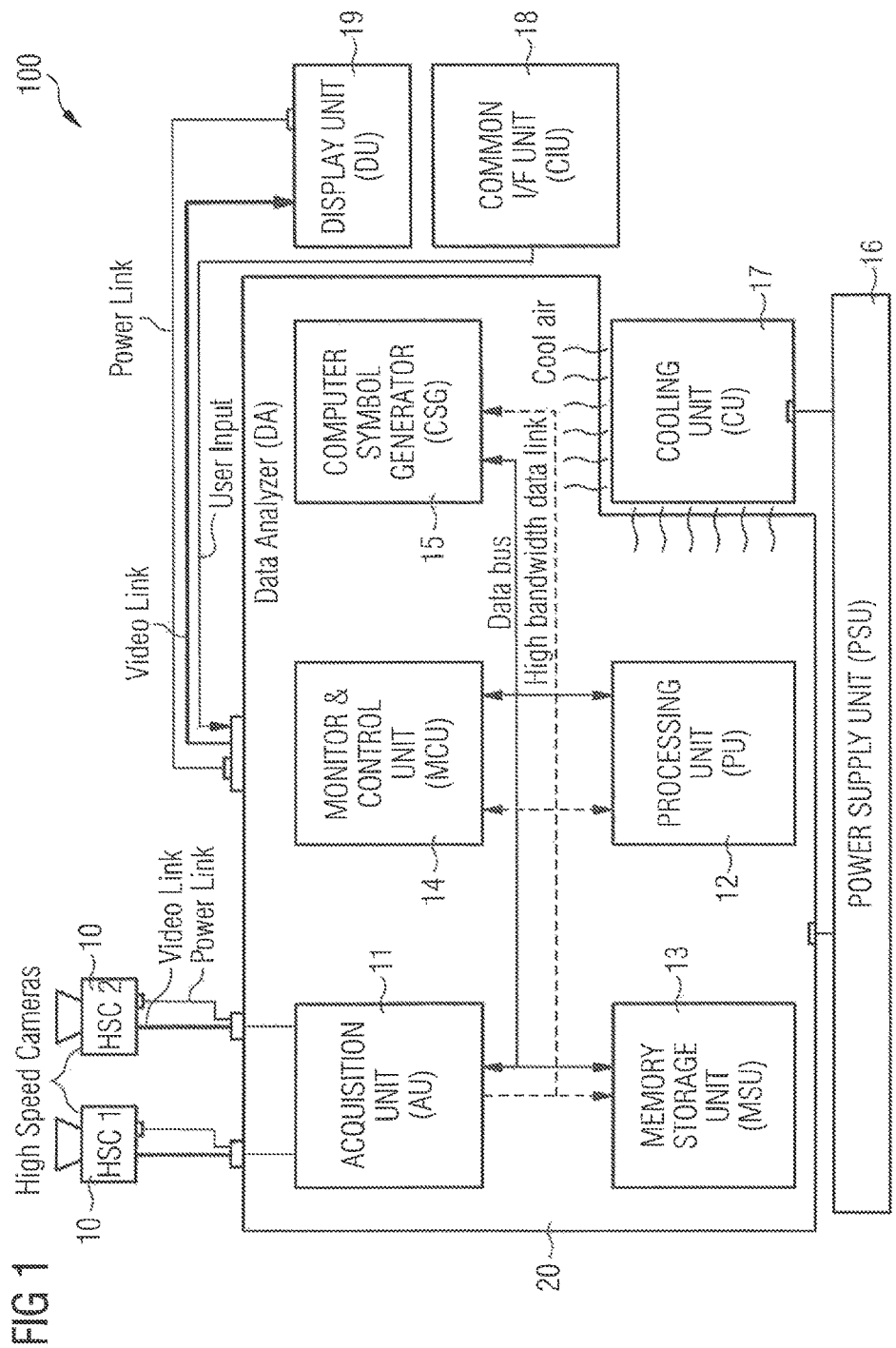
FIG. 1 is a schematic representation of an embodiment of a modular device for high-speed video vibration analysis.

FIG. 1 schematically illustrates an embodiment of the device for high-speed video vibration analysis that is referred to as modular device for high-speed video vibration analysis 100 in the following. The modular device for high-speed video vibration analysis 100 comprises two high-speed cameras 10, which form part of the camera arrangement in this embodiment. The modular high-speed cameras 10 are connected via power lines and data lines to the data analyzer unit 20. Although, two cameras shown in FIG. 1, by way of example, the present disclosure is not limited to two high-speed cameras. The data analyzer unit 20 comprises, by way of example in FIG. 1, an acquisition unit 11, a processing unit 12, a memory storage unit 13, a monitor and control unit 14 and a computer symbol generator 15. The acquisition unit 11 controls the high-speed camera operations and the grabbing of the high-speed video streams from the high-speed cameras 10.

The processing unit 12 comprises two main pipelined stages, referred to as a pre-processing stage and a post-processing stage. The pre-processing stage performs spatial temporal filtering of the incoming video streams by means of image processing techniques. The post-processing stage operates on the pre-processed video stream by extracting motions/vibrations of the captured structure, herein referred to as deformations, being filmed/captured along the observed surface plane (in-plane axis) and/or normal to it (out-of-plane axis). Out-of-plane motion can be extrapolated by means of state of the art stereo-vision processing techniques, for example disparity image, coupled with statistical models to handle uncertainties of the calculated depth-of-pixels (inferred depth). Motion data referred to the coordinate system of the observed surface/structure can be referred to another coordinate system, for example the camera x-y-z system, by means of a canonical geometric transformation. The processing unit 12 may exploit expandable clusters of graphics processing units and central processing units to achieve parallel processing of the incoming high-speed video streams.

The memory storage unit 13 is connected to the data analyzer unit via a high-bandwidth data link and a dedicated power link, stores the grabbed/captured video sessions/high-speed video streams and provides the same for replay. The memory unit 13 is further adapted and configured to store test settings, inputs and outputs as required by a user. Access to the memory storage unit content is possible via a software based graphical user interface of the device. Backup/upload of the data stored in the memory storage unit can be done by an external commercial off-the-shelf memory unit, connected to the device via commercial standard interfaces like universal serial buses.

The monitor and control unit 14 synchronizes data transfer, data processing and all wired/wireless inputs and outputs of the data analyzer unit 20. The computer symbol generator 15 combines the outputs of the processing unit 12, for example frequencies and amplitudes, with an acquired video, user inputs and user settings, model-based results of the vibration analysis (if available).

FIG. 1 further illustrates, by way of example, a power supply unit 16, a cooling unit 17, a common interface unit 18 and a display unit 19, each separated from the data analyzer unit 20. The power supply unit 16 provides power to the cooling unit 17, the high-speed cameras 10 and the data analyzer unit 20. The cooling unit 17 provides heat dissipation for the data analyzer unit 20. The common interface unit 18 provides a dedicated keyboard, a mouse and/or a universal serial bus port. The display unit 19 provides a display for user inputs and user settings, input video, for example a replay mode, extracted vibrational data, post processed video and/or any synthetic or model-based representation of the detected motions/vibrations/deformations. All the units of the modular device for high-speed video vibration analysis 100 may be mechanically, electrically and procedurally modular.

FIG. 2 schematically illustrates an arrangement comprising two high-speed video cameras 10 and a structure 1 to be filmed, wherein "filmed" can be understood to mean that the structure is captured by the two high-speed cameras 10. It is possible that more than two cameras 10 capture the structure 1. Alternatively, only one camera 10 may be arranged to capture the structure, wherein the camera 10 may be movable to capture the structure 10 from different perspectives and/or the camera 10 itself comprises optics to generate images that correspond to images taken from different perspectives. The arrangement illustrates the two high-speed cameras 10 separated from each other via a baseline. The two high-speed cameras 10 capture the structure 1 from different angles and each one of the high-speed cameras 10 generates a high-speed video stream. The two high-speed cameras are connected to a data analyzer unit such as data analyzer unit 20 and are synchronized by the data analyzer unit, e.g., data analyzer unit 20. The high-speed cameras 10 may be connected to the data analyzer unit, e.g., data analyzer unit 20, via dedicated high bandwidth video links and dedicated power links. The high-speed cameras 10 are illustrated as being mounted on transportable platforms like tripods 2, separated from the data analyzer unit, e.g., data analyzer unit 20, aligned to the structure 1 viewpoints of interest.

FIG. 3 schematically illustrates a sensor head unit 21 providing the modular device for high-speed video vibration analysis 100 with two cameras 10 positioned on the sensor head unit 21. It provides an elevation motor and an azimuth motor, which allow an elevation swing/rotation and an azimuth swing/rotation (or yaw and pitch). The sensor head unit 21 is illustrated as mounted on the data analyzer unit 20, but may also be positioned as a standalone device or mounted on a separate structure like a tripod. The sensor head unit 21 comprises an extensible guiderail with sliding attach-points for the high-speed cameras 10. The two high-speed cameras 10 are separated from each other via a baseline. The length of the baseline is regulated for stereo vision processing which provides a means to control the overall accuracy of the inferred depth of the structure to be captured. The sensor head unit 21 can further be moved in elevational direction and azimuthal direction, which provide an illumination in space. The sensor head unit 21 provides an optimal orientation towards the structure parts to be monitored and provides a wider range of testing conditions. When using dedicated zoom optics for the high-speed cameras 10, structures situated at virtually any practical distance from the operator may be analyzed. The high-speed cameras 10 are thought to be easily detachable from the sensor head unit 21 leading to an improved equipment maintainability/reparability. The baseline displacements and gimbal rotations of the sensor head unit may be set up manually or be actively controlled via motors and actuators by the digital analyzer unit 20. Additional use of solid state accelerometers and/or gyro sensors and/or motion sensors, attached to a motorized gimbal platform and/or passive dumpers, a motion-stabilized, actively controlled sensor head unit 21 is obtained and allows self-motion compensation (for example, a flight test), in order to eliminate undesired vibrations. The accelerometers and/or the gyro sensors and/or the motion sensors enable the modular device for high-speed video vibration analysis to keep track of vibrations of the sensor head unit 21 and/or of the motorized gimbal platform and/or of the high-speed cameras 10. It is therefore possible to isolate self-vibrations of the sensor head unit 21 and/or of the motorized gimbal platform and/or of the high-speed cameras 10 from those of the structure parts being monitored. This is due to the fact that, whenever a vibration of the structure parts to be monitored propagates back to the camera arrangement, the camera itself will be excited by this vibration. The motion sensors can optionally be used to improve the accuracy and to reduce an amount of processing when estimating a correct position of the high-speed cameras 10 with respect to an observed environment and/or the parts of the structure to be monitored. The platform is easily storable in a suitable portable hardware/ruggedized case, which leads to an easy-to-install system.

FIG. 4 schematically illustrates the modular device for high-speed video vibration analysis 100 with the high-speed cameras 10 mounted on a gimbal system 21 with an elevation gimbal and an azimuth gimbal, and two sliding rails which provide a variable baseline distance. Additional to FIG. 1, FIG. 4 illustrates a control for the sensor head unit 21, which is a gimbal system 21 in this embodiment. The data analyzer unit 20 receives a sensor head unit status and reacts on the status by controlling the sensor head unit's orientation.

FIG. 5 schematically illustrates an embodiment of the modular device for high-speed video vibration analysis 100 capturing/filming a target structure 1 by two separate high-speed camera systems 21 mounted on (or enclosed in) a separate independent structure, a gimbal system. The target structure 1 is captured by both sensor head units 21, both aligned in an orthogonal angle to each other. Additionally, an enhanced data analyzer unit 20 with two acquisition units 11 is provided to control and connect the synchronized acquisition from multiple, independent sensor head units 21. This setting provides an exact representation of the target structure's deformations/vibrations/motions, for example a coupled torsion/flexion on a wing profile. This system architecture allows cross-validation of vibrational data (in-plane/out-of-plane modes and deformations) calculated from the different perspectives, for example comparing the structure's deformations along a front-view and a lateral view. This system architecture further allows merging of vibrational data of multiple sensor head units 21 improving accuracy and robustness of the modular device for high-speed video vibration analysis's outputs (sensor fusion).

Figure 6:
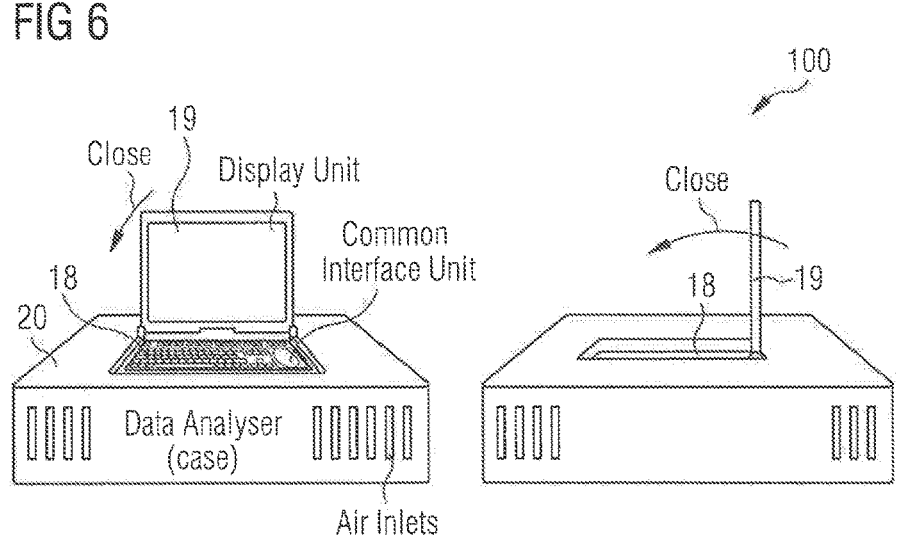
FIG. 6 is a schematic representation of a display unit and a common interface unit on top of a data analyzer case with air inlets.

FIG. 6 schematically illustrates a part of the modular device for high-speed video vibration analysis 100 including a display unit 19, a common interface unit 18 and a data analyzer unit 20, wherein the data analyzer unit 20 is provided within a hardware/ruggedized case. The display unit 19 is illustrated as being integrated in a laptop, which is connected to the data analyzer unit 20, which has air inlets for cooling issues.

Figure 7:
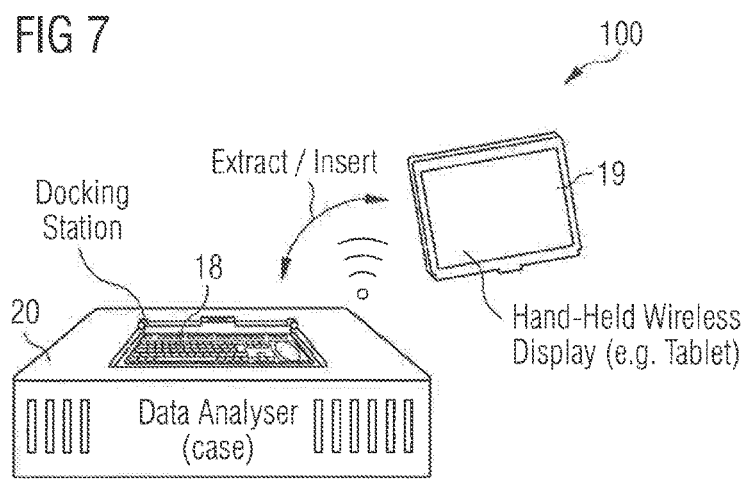
FIG. 7 is a schematic representation of a detachable hand-held device and a docking station usable with the data analyzer described herein.

FIG. 7 schematically illustrates a hand-held wireless display 19, for example a tablet device, a docking station and the common interface unit 18. It shows a possibility of extracting or inserting the hand-held wireless display 19 to the docking station, wherein the docking station is connected to the data analyzer unit 20. The computer may be a laptop, a tablet or a similar device, which can be wired or wirelessly connected to the data analyzer unit 20. The tablet device combines a user input interface and the display unit 19 in one single portable item. The docking station is used as a docking station for a battery recharge of the tablet's battery. This is useful and suitable for remote control anytime the device is to be used in hazardous/safety critical areas where the operator's safety is a primary concern.

FIG. 8 illustrates a schematic flow diagram of a method embodiment for high-speed video based non-contact vibration analysis of a structure. The method embodiment may be implemented by any suitable embodiment of the high-speed video vibration analysis device 100 described herein. The camera arrangement generates (in step S1) at least two high-speed video streams of the structure. The processing unit estimates (in step S2), from at least one of the at least two high-speed video streams, deformations of at least a portion of the structure along a first plane. The processing unit further determines (in step S3), from the at least two high-speed video streams, depth information of at least a portion of the structure along a second plane. The second plane is different from the first plane. The processing unit further extracts (in step S4) vibrational data of at least the portion of the captured structure by combining the estimated deformations of at least the portion of the captured structure along the first plane, and the determined depth information of at least the portion of the captured structure along the second plane.

FIGS. 9a to 9j may respectively be part of a method embodiment of the high-speed video based non-contact vibration analysis of a structure. The method embodiment comprising one or more of the methods shown respectively in FIGS. 9a to 9j may be considered a more detailed version of the method embodiment of FIG. 8. The method embodiment comprising one or more of the methods shown respectively in FIGS. 9a to 9j may be implemented by any suitable embodiment of the high-speed video vibration analysis device 100 described herein.

Figure 9A:
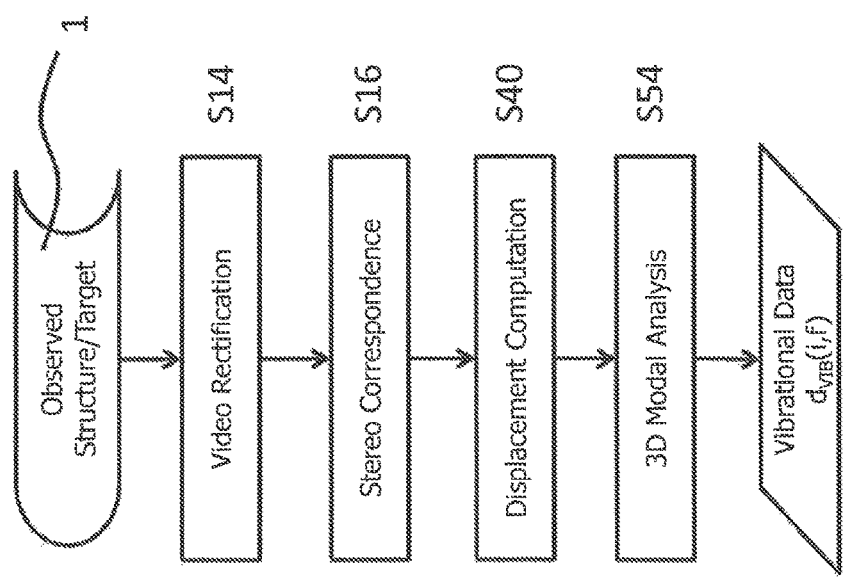
FIG. 9a is a schematic flow diagram of a method embodiment for high-speed video based non-contact vibration analysis of a structure.

FIG. 9a illustrates a schematic flow diagram of a method embodiment of the high-speed video based non-contact vibration analysis of a structure. The method embodiment of FIG. 9a comprises, by way of example, the steps of video rectification (step S14, in detail illustrated in FIGS. 9c and 9d), stereo correspondence processing (step S16, in detail illustrated in FIG. 9e), optical-flow displacement computation (step S40, in detail illustrated in FIG. 9i) and 3D modal analysis (step S54, in detail illustrated in FIG. 9j).

These process steps of the high-speed video based non-contact vibration analysis of a structure are illustrated in detail in at least some of FIGS. 9b to 9j.

Figure 9B:
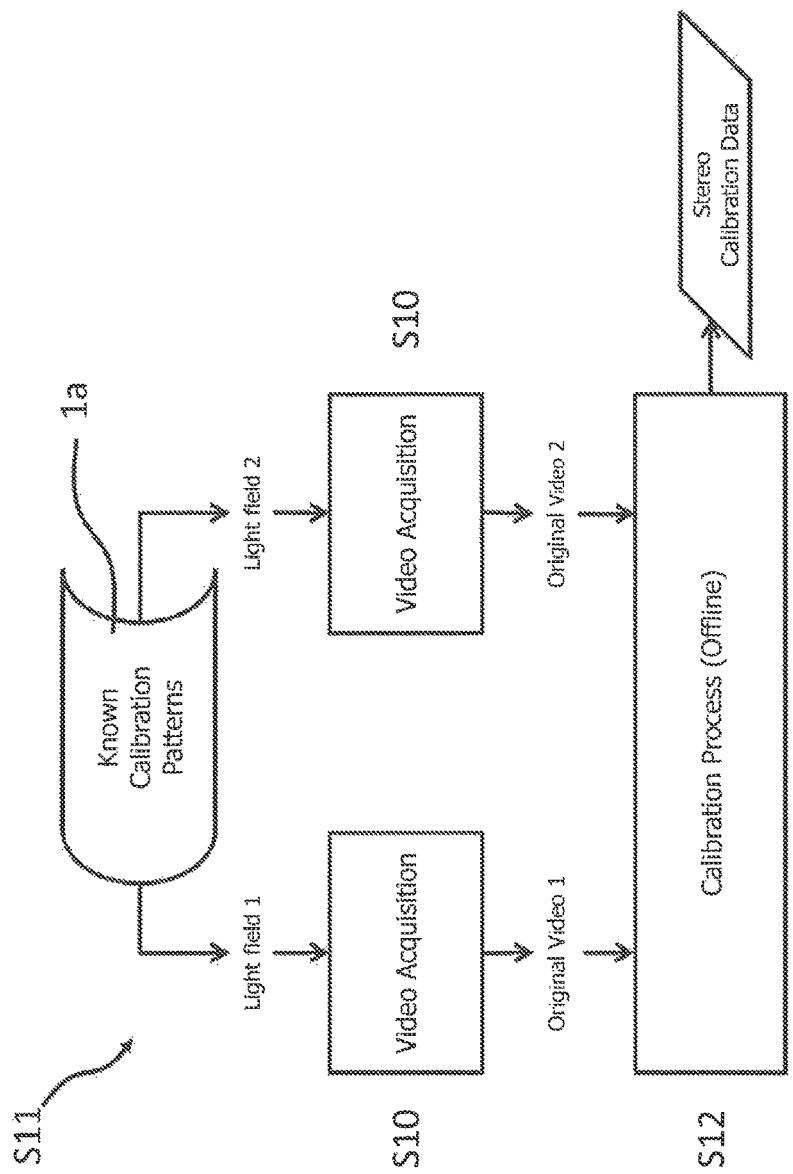
FIG. 9b is a schematic flow diagram of a calibration process that may be part of the embodiments for high-speed video based non-contact vibration analysis of a structure.

FIG. 9b illustrates a schematic flow diagram of a calibration process (S11) for the modular device for high-speed video vibration analysis 100. One or more known calibration patterns 1a are captured via the present light field 1 and light field 2 by video acquisition (step S10). The video acquisition may be considered a combined step of the high-speed cameras 10 and the acquisition unit 11, which provide an original video 1 and an original video 2 to the offline calibration process (step S12). The calibration process (step S12) provides, in consequence, stereo calibration data. The offline calibration process (step S12) calculates intrinsic parameters, for example focal length, image centers and lenses distortion. The offline calibration process (step S12) further calculates extrinsic parameters, for example an affine matrix defining the alignment among the high-speed cameras. The stereo calibration data is provided to a video rectification process (video transformation and filtering), the pre-processing stage (enhancing SNR on frame-by-frame basis), the triangulation process (computing depth-of-pixels, inferred depth) and the step of reconstructing a 3D displacement vector within a 3D modal analysis (evaluate vibrational data).

FIG. 9c illustrates a schematic flow diagram of the capturing process (step S13) of a target/structure 1, which is captured via the light field 1 and light field 2 by the video acquisition (step S10). Then, the original video 1 and the original video 2 are provided to the video rectification process (step S14). The video rectification process (step S14) is provided with stereo calibration data and the video rectification process (S14) outputs a rectified video 1 and a rectified video 2 to a stereo correspondence process. The video rectification process (S14) converts an original stereo video pairs to a standard form by using lens distortion removal techniques and roto-translation techniques (3D object space to 2D camera plane).

Figure 9D:
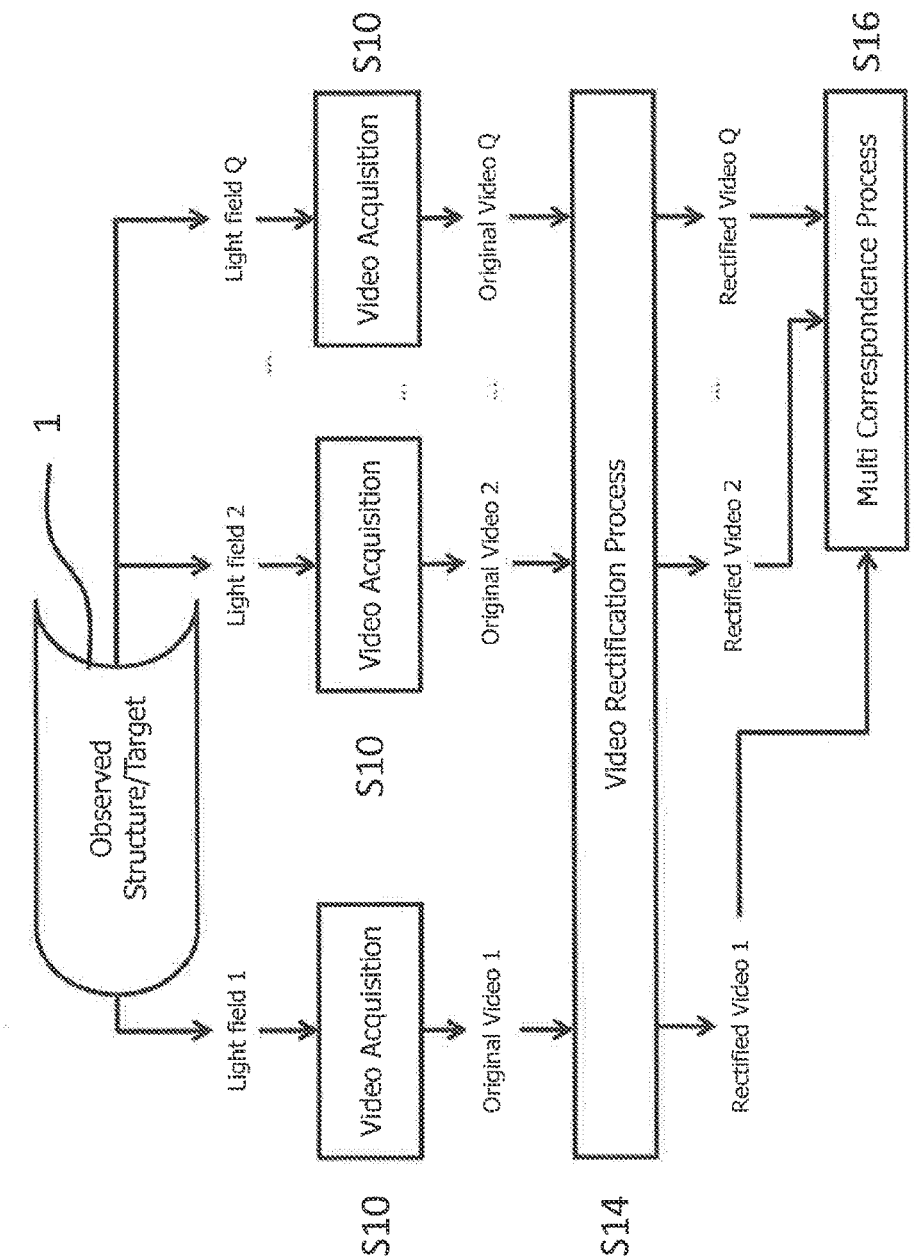
FIG. 9d is a schematic flow diagram of a video acquisition process with multiple correspondence processing that may be part of the embodiments for high-speed video based non-contact vibration analysis of a structure.

FIG. 9d illustrates a schematic flow diagram of an extension of the acquisition process of FIG. 9c by at least another light field video acquisition (S10) and a multi-correspondence process (S16) instead of the stereo correspondence processes in FIG. 9c. The multi correspondence process is provided by the multiple rectified videos, which have been rectified by the video rectification process (S14).

Figure 9E:
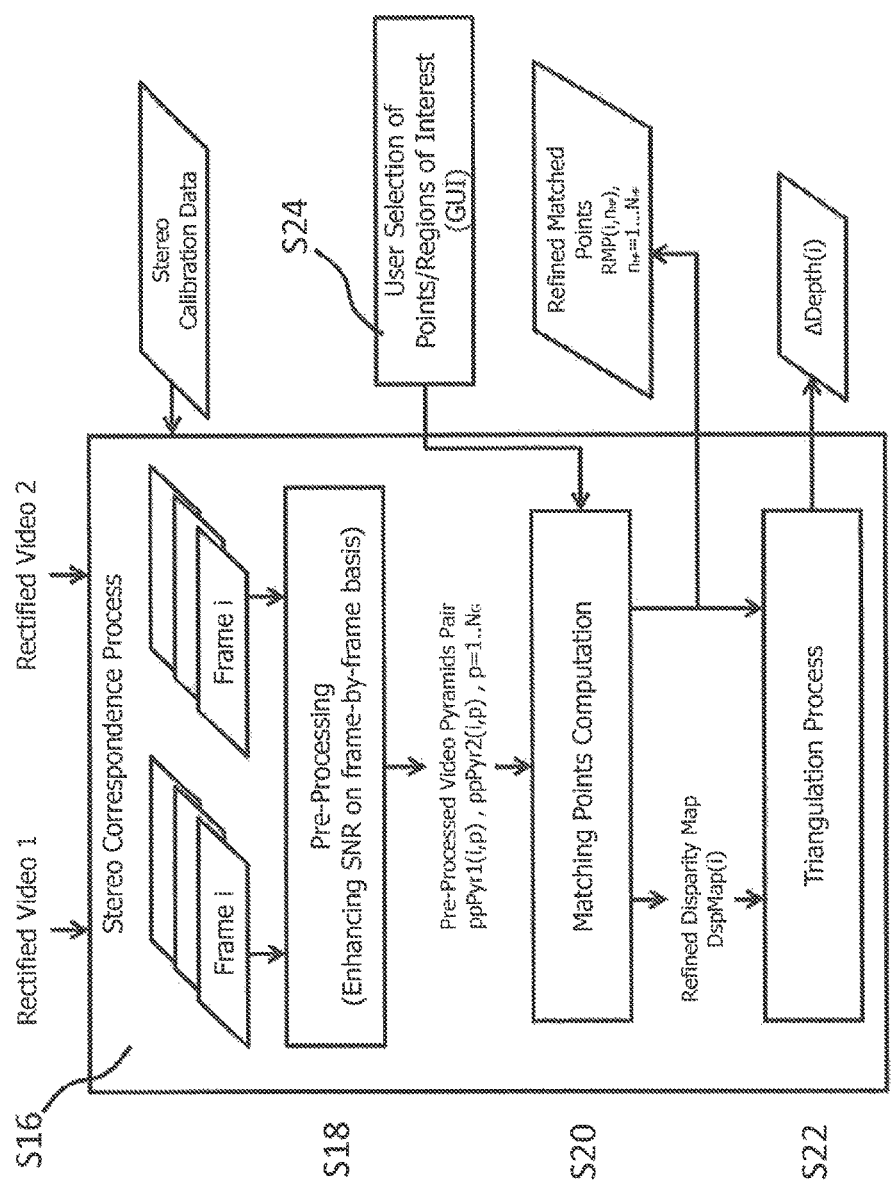
FIG. 9e is a schematic flow diagram of a stereo correspondence process that may be part of embodiments for high-speed video based non-contact vibration analysis of a structure.

FIG. 9e illustrates a schematic flow diagram of the stereo correspondence process (S16), which aims at finding homologous "matching" points in the incoming video pair. It is fed by the rectified video 1 and the rectified video 2. The pre-processing step (step S18, in detail illustrated in FIG. 9f) includes enhancing SNR (Signal-Noise-Ratio) on a frame-by-frame basis. A pre-processed video pyramids pair is outputted by the pre-processing stage. Afterwards, with the use of user selected (step S24) points and regions of interest from the graphical user interface (GUI), matching points are computed (step S20, in detail illustrated in FIG. 9g). As a result of this computation, a refined disparity map and refined matched points are outputted and used by a triangulation process (step S22, in detail illustrated in FIG. 9h), which itself outputs a computed depth map time variation $\Delta depth(i)$, herein referred to inferred depth and estimated depth variation over time.

Figure 9F:
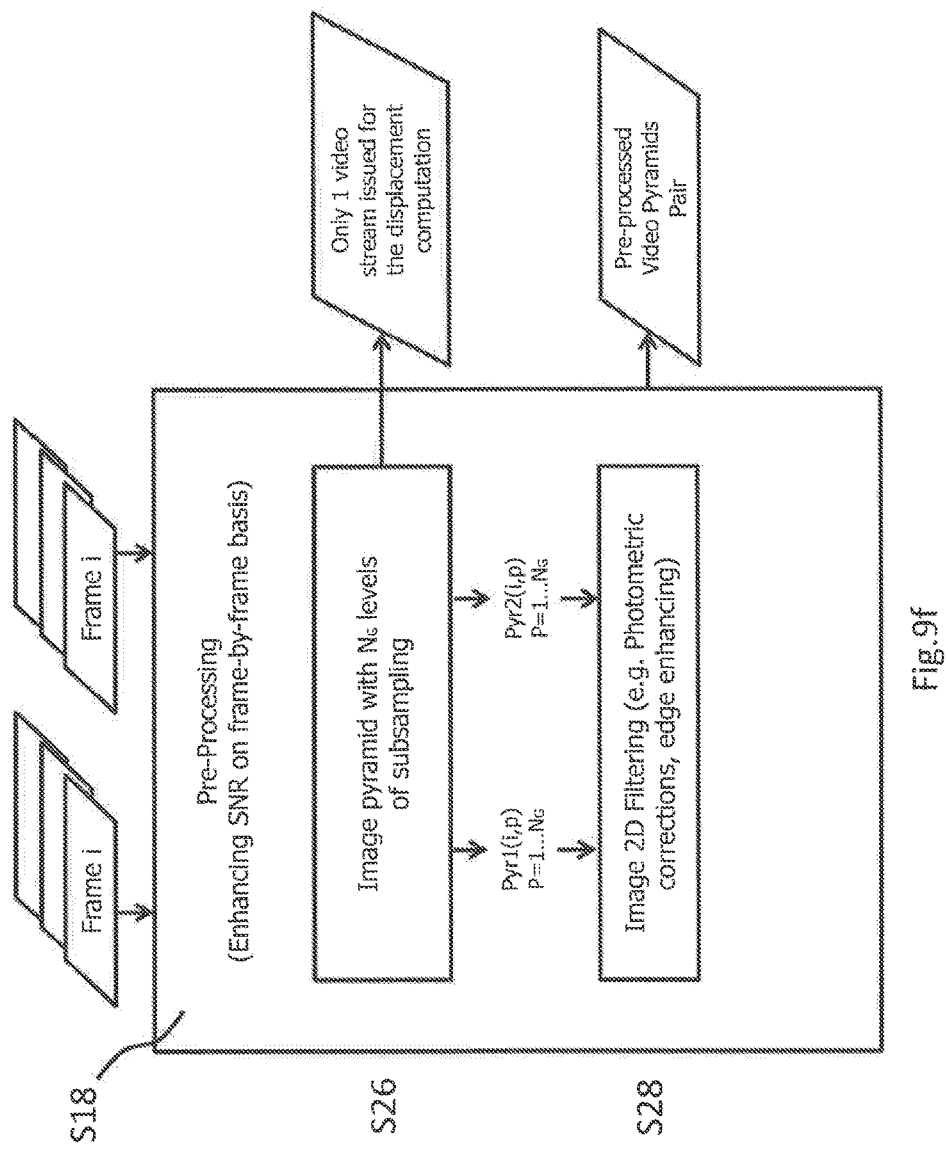
FIG. 9f is a schematic flow diagram of a pre-processing process that may be part of the embodiments or high-speed video based non-contact vibration analysis of a structure.

FIG. 9f illustrates a schematic flow diagram of pre-processing (step S18) by enhancing the SNR on a frame-by-frame basis by computing an image pyramid (S26) for each frame i with NG levels of subsampling and then image 2D filtering (S28) of each frame i of the high-speed video stream, for example photometric correction or edge enhancement. The image pyramid may be a Gaussian pyramid or a Laplacian pyramid or a combination thereof, for example. After building the image pyramid (step S26), only one video stream is issued for a displacement computation, but may be extended to two or more video streams. After image 2D filtering (step S28), a pre-processed video pyramids pair (Pyr1(i,p) and Pyr2(i,p)) is passed to the matching points computation.

Figure 9G:
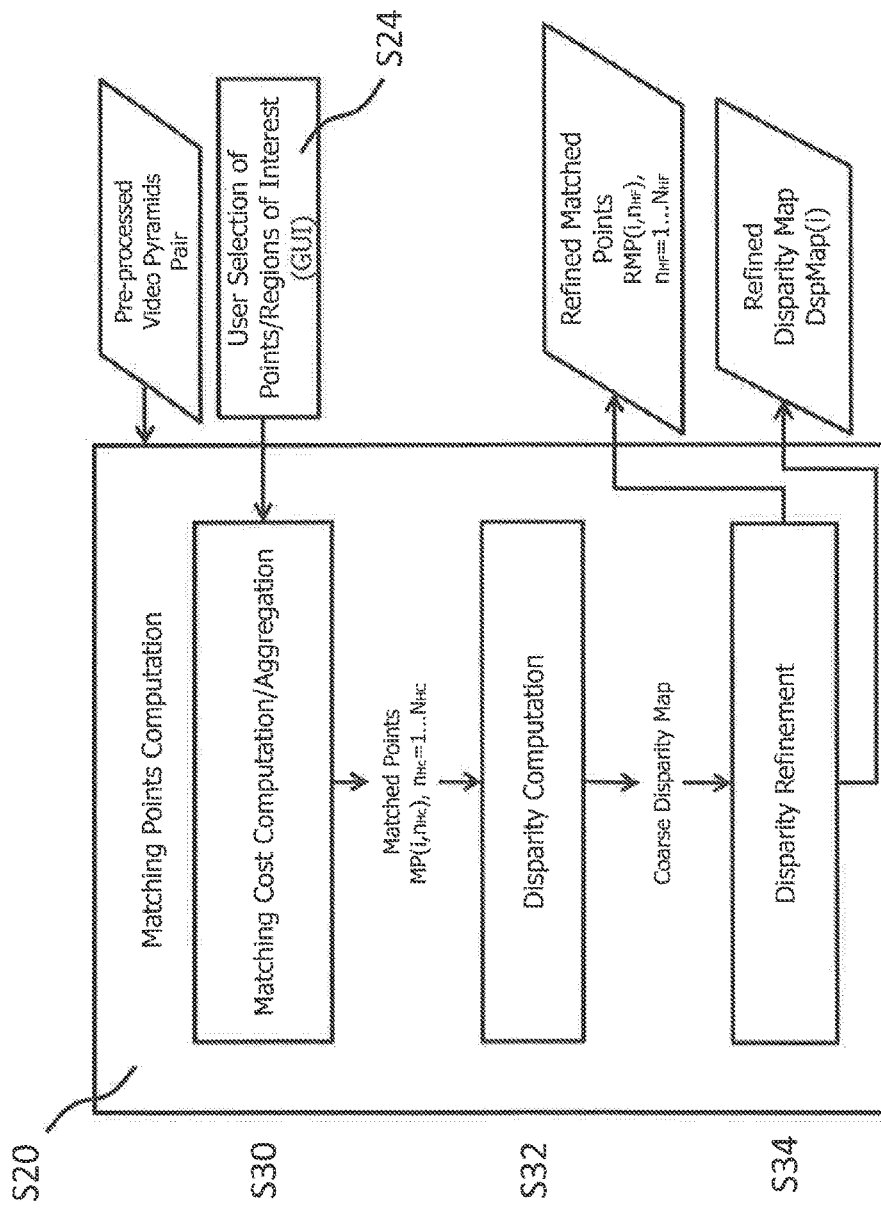
FIG. 9g is a schematic flow diagram of a computation of matching points that may be part of embodiments for high-speed video based non-contact vibration analysis of a structure.

FIG. 9g illustrates a schematic flow diagram of the computation of the matching points (step S20), wherein the computation is based on the pre-processed video pyramids pair and the user selected points/regions of interest from the graphical user interface (GUI) (step S24). The matching cost computation/aggregation (step S30) is provided by the points/regions of interest and provides the disparity computation (step S32) with matched points found in the video pyramids pair. A coarse disparity map is computed by disparity computation methods (step S32) and the coarse disparity map is refined (step S34), which leads to the outputs of refined matched points and a refined disparity map. These two are provided to the triangulation process, wherein the refined matched points are additionally provided to the displacement computation.

FIG. 9h illustrates a schematic flow diagram of the triangulation process (S22) with the inputs of a refined disparity map and refined matched points, wherein the triangulation process (step S22) is fed with stereo calibration data. The triangulation process (step S22) computes (step S36) a depth map, computes a following depth map time variation (step S38) and provides the 3D modal analysis with the change in depth-of-pixels (inferred depth ΔDepth (i)).

Figure 9I:
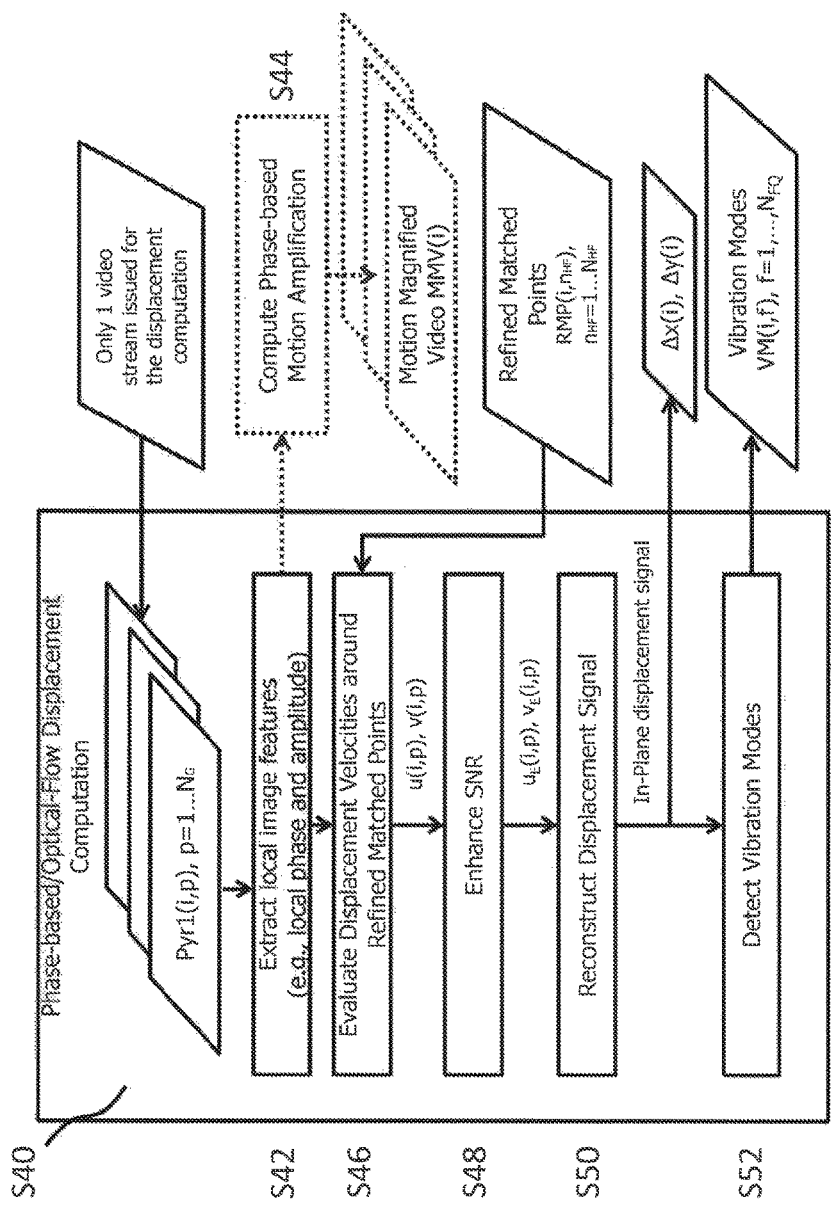
FIG. 9i is a schematic flow diagram of a displacement calculation that may be part of the embodiments for high-speed video based non-contact vibration analysis of a structure.

FIG. 9i illustrates a schematic flow diagram of the displacement computation (step S40) which is issued by only one video stream with including image pyramids (frames). At first, local image features (e.g., local phase and amplitude) are extracted (step 42), wherein a motion amplification (step 44) can be optionally computed and a motion magnified video can be generated. Then, displacement velocities around refined matched points are evaluated (step S46) by the help of refined matched points. Afterwards, the SNR is enhanced (step S48) and the displacement signal is reconstructed (step S50), which leads to an in-plane displacement signal fed to the 3D modal analysis process. The vibration modes are detected (step S52) via the in-plane displacement signal, which provide the 3D modal analysis with vibration modes.

Figure 9J:
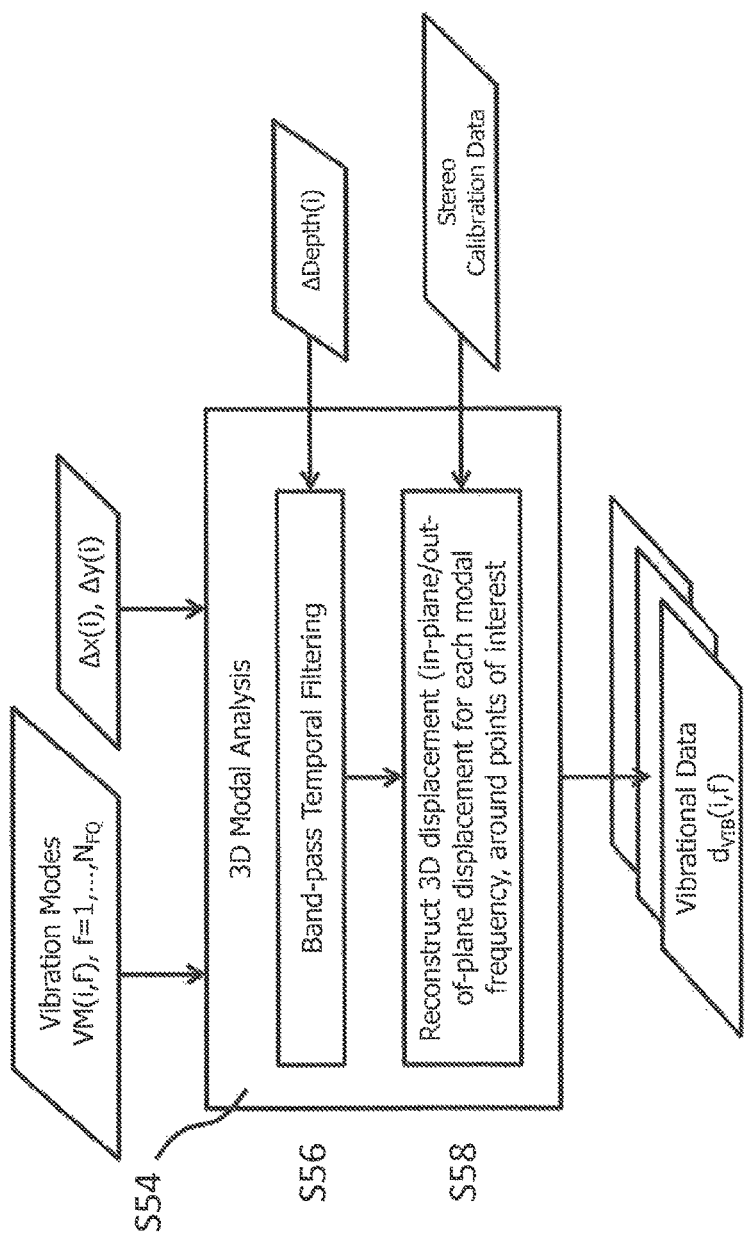
FIG. 9j is a schematic flow diagram of a 3D modal analysis that may be part of embodiments for high-speed video based non-contact vibration analysis of a structure.

These two signals are combined in the 3D modal analysis (step S54), illustrated in FIG. 9j as schematic flow diagram. The two signals are combined in a band-pass temporal filter (step S56) with an additional input of the difference inferred depth Δdepth(i) of each frame of the high-speed video stream. After band-pass temporal filtering (S56), a 3D displacement vector is reconstructed (step S58, in plane/out-of-plane displacement for each modal frequency, around each point of interest/region of interest). The result of the 3D modal analysis is outputted as vibrational data.

With help of the embodiments described above, it is possible to monitor and operate a video based sensor capable of early-detection/early-warning of dangerous structural vibrations/deformations, which can be applied in automotive, aerospace (aircrafts, helicopters, satellites), civil (building structures, bridges, roads, rail-roads), transportation (trains, ships), defense and security, for example electro-optic and electro-acoustic sensors, capable of detecting (tracking) far/quick/low observable objects by analyzing the optic/acoustic vibrations produced into the surrounding environment (i.e., infrared missile warner or landmine detectors) and medical imaging. Vibration tests on large and/or complex structures can be performed by the modular device for high-speed video vibration analysis and is not limited in performance and portability. Additionally, the high-speed cameras may be optical passive sensors which emit no energy and achieve very high digital resolutions. It is foreseen a sensible reduction of development, production, testing and maintenance costs as well as of the related "non-quality" costs. It therefore reduces considerably man-hour costs and also costs associated to non-quality (maintenance and repair).

In accordance therewith, user experience compared to current achievements by means of LDVs is at least maintained. Furthermore, notable advantages compared to LDVs are offered, for example in being much more affordable in terms of direct costs and more versatile in terms of operational conditions.

Still further, the device described herein may be for indoor and outdoor usage, can be positioned at virtually any orientation and distance to the target and may monitor structures of any size.

Still further, development, production and non-quality costs of the items/structures being manufactured may be reduced, and product quality may simultaneously be improved. This may lead to mitigation of a number of problems that are constantly faced in areas like engineering, operation and production (i.e., time constraints or lack of space and resources).

Still further, the non-contact vibration analysis technique described herein may a) require a setup time that is more rapidly and cost-effectively achieved (if compared to accelerometers), and b) be more versatile to operate, both in indoor and outdoor testing environment as well as for ground and in-flight testing.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for high-speed video vibration analysis, the device comprising:
   a camera arrangement configured to generate at least two high-speed video streams of the structure;
   a data analyzer unit, connected to the camera arrangement, the data analyzer unit comprising
   a processing unit configured to:
   estimate, from at least one of the at least two high-speed video streams, deformations of at least a portion of the captured structure along a first plane,
   determine, from the at least two high-speed video streams, depth information of at least a portion of the captured structure being one of along a second plane, different from the first plane, or along an axis included in the second plane, detect vibration modes associated with the estimated deformations of at least the portion of the captured structure along the first plane, and extract vibrational data of at least a portion of the captured structure by combining the estimated deformations of at least the portion of the captured structure along the first plane, the detected vibration modes associated with the estimated deformations of at least the portion of the captured structure along the first plane and the determined depth information of at least the portion of the captured structure along the second plane.

2. The device of claim 1, wherein the data analyzer unit comprises an acquisition unit configured to at least one of control the camera arrangement or synchronize the at least two high-speed video streams.

3. The device of claim 1, wherein the processing unit is configured to rectify the at least two high-speed video streams onto the first plane.

4. The device of claim 1, wherein the camera arrangement comprises at least two high-speed cameras, wherein each camera is arranged and configured to capture the structure and generate a high-speed video stream of the at least two high-speed video streams.

5. The device of claim 1, wherein the second plane is perpendicular to the first plane.

6. The device of claim 1, further comprising:
a display unit configured to display at least one of
a user input,
a user setting,
one or more of the at least two high-speed video streams,
the extracted vibrational data of at least the portion of the captured structure, and a synthetic or model-based representation of the estimated deformations, or
the computed depth information.

7. The device of claim 1, further comprising:
a graphical user interface configured to import and display model-based results and align the model-based results with the extracted vibrational data by dedicated controls and windows of the graphical user interface.

8. A device for high-speed video vibration analysis, the device comprising:
a camera arrangement configured to generate at least two high-speed video streams of the structure;
a data analyzer unit, connected to the camera arrangement, the data analyzer unit comprising
a processing unit configured to:
estimate, from at least one of the at least two high-speed video streams, deformations of at least a portion of the captured structure along a first plane,
determine, from the at least two high-speed video streams, depth information of at least a portion of the captured structure being one of along a second plane, different from the first plane, or along an axis included in the second plane,
extract vibrational data of at least a portion of the captured structure by considering the estimated deformations and the determined depth information, wherein the camera arrangement comprises a high-speed video camera that is configured to operate in a visible spectrum and a high-speed video camera that is configured to operate in a non-visible spectrum.

9. A device for high-speed video vibration analysis, the device comprising:
a camera arrangement configured to generate at least two high-speed video streams of the structure;
a data analyzer unit, connected to the camera arrangement, the data analyzer unit comprising
a processing unit configured to:
estimate, from at least one of the at least two high-speed video streams, deformations of at least a portion of the captured structure along a first plane,
determine, from the at least two high-speed video streams, depth information of at least a portion of the captured structure being one of along a second plane, different from the first plane, or along an axis included in the second plane, and
extract vibrational data of at least a portion of the captured structure by considering the estimated deformations and the determined depth information; and
a moveable platform on which the camera arrangement is arranged the moveable platform comprising at least one of accelerometers, gyro sensors, or motion sensors configured to detect self-vibrations of at least one of the moveable platform or the camera arrangement, and further configured to provide the resulting self-vibration data to the data analyzer unit, wherein the processing unit is further configured to correct the vibrational data of the structure parts being monitored, based on the detected self-vibrations, the moveable platform comprising at least one of accelerometers, gyro sensors, or motion sensors configured to detect self-vibrations of at least one of the moveable platform or the camera arrangement, and further configured to provide the resulting self-vibration data to the data analyzer unit, wherein the processing unit is further configured to correct the vibrational data of the structure parts being monitored, based on the detected self-vibrations.

10. A method for high-speed video vibration analysis of a structure, utilizing a camera arrangement and a processing unit of a data analyzer unit, the method comprising:
generating, by the camera arrangement, at least two high-speed video streams of the structure;
estimating, by the processing unit of the data analyzer unit, from at least one of the at least two high-speed video streams, deformations of at least a portion of the structure along a first plane;
determining, by the processing unit, from the at least two high-speed video streams, depth information of at least a portion of the structure along a second plane, different from the first plane, or along an axis included in the second plane;
detecting, by the processing unit, vibration modes associated with the estimated deformations of at least the portion of the captured structure along the first plane; and
extracting, by the processing unit, vibrational data of at least a portion of the captured structure by combining the estimated deformations of at least the portion of the captured structure along the first plane, the detected vibration modes associated with the estimated deformations of at least the portion of the captured structure along the first plane and the determined depth information of at least the portion of the captured structure along the second plane.

11. The method of claim 10, wherein the portion of the captured structure is at least one of a user-selected point or region of the structure.

12. The method of claim 10, wherein the steps of estimating, determining and extracting are performed in a user-selected order.

\* \* \* \* \*